Oct. 15, 1935.  S. DE ORLOW  2,017,530
HANDLE ASSEMBLY
Filed March 31, 1933   2 Sheets-Sheet 2

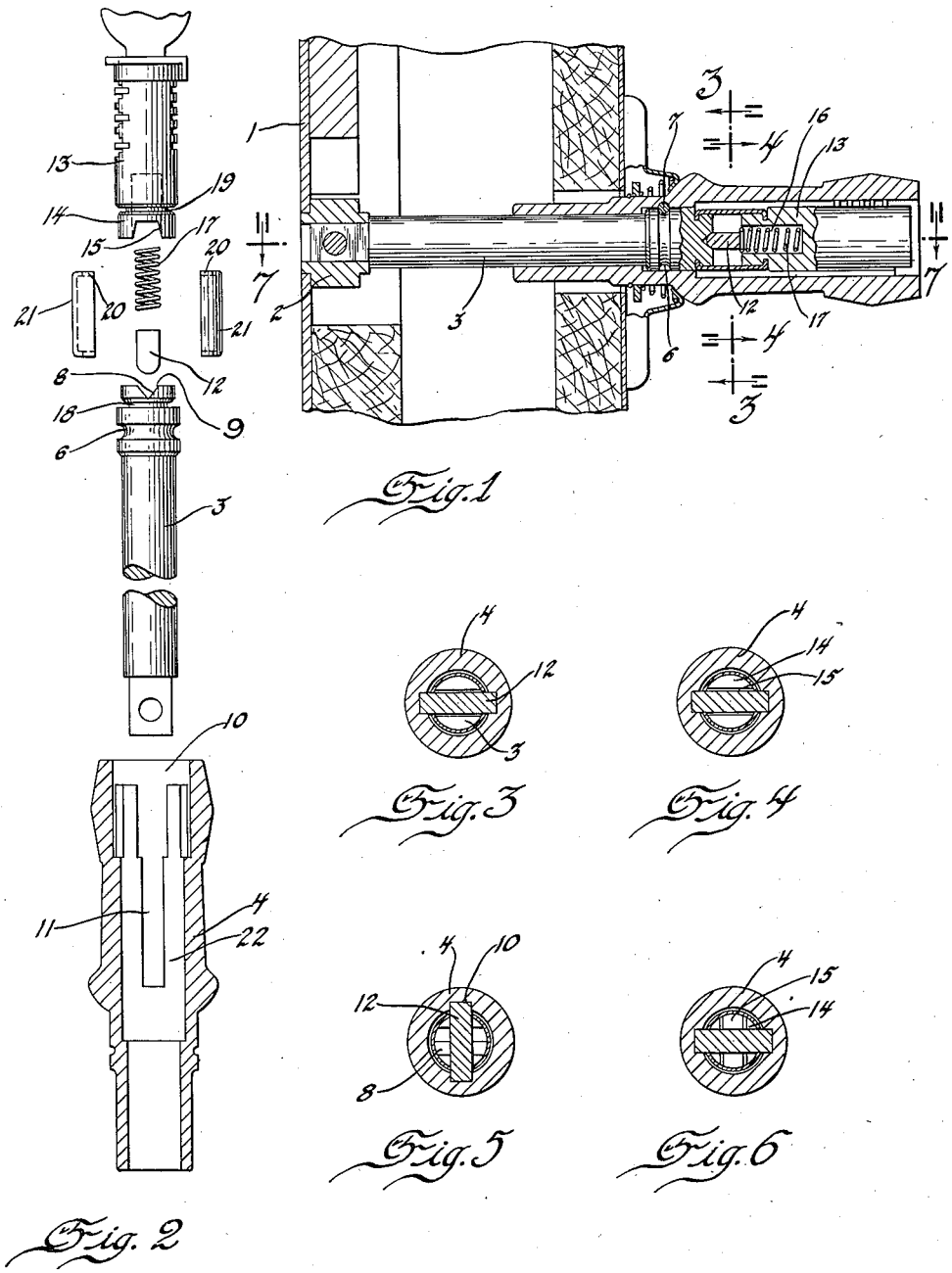

INVENTOR.
Stephen DeOrlow
BY
Barnes, Kisselle & Laughlin
ATTORNEYS

Patented Oct. 15, 1935

2,017,530

UNITED STATES PATENT OFFICE 2,017,530

HANDLE ASSEMBLY

Stephen De Orlow, Detroit, Mich., assignor to Ternstedt Manufacturing Company, Detroit, Mich., a corporation of Michigan Application March 31, 1933, Serial No. 663,725

9 Claims. (Cl. 70—91)

This invention relates to a handle assembly for retracting the latch bolt of a door latch, and more particularly to that type of handle assembly having a spindle and a shank freely rotatable thereon, and a clutch for interengaging the spindle and the shank to effect retraction of the bolt when the interengaged spindle and shank are rotated.

It is appreciated that a handle assembly comprising a spindle and a shank freely rotatable one about the other and provided with a clutch for interlocking the shank and spindle is broadly old. In this type of handle assembly when the shank is provided with a handle of the lever type and is disengaged from the spindle so as to be freely rotatable about the spindle, the handle sometimes drops to the vertical position. This is particularly undesirable when such a handle is used on an automotive vehicle because for æsthetic reasons it is desirable to maintain the lever handle horizontal, and particularly where there are a plurality of handles side by side as in the case of the front and rear outside door handles of an automotive vehicle body. Then too, an outside door handle of this type for a vehicle body when the shank is disengaged from the spindle and the vehicle is in motion will swing freely back and forth.

It is an object of this invention to overcome this difficulty by providing a yieldable clutch connection between the shank and the spindle which is sufficiently strong to hold the lever handle in the position desired and yet weak enough so that it will yield in case an attempt is made to retract the bolt by turning the handle.

In this type of handle assembly the clutch for interengaging the shank and the spindle is usually operated by a cylinder lock and the shank must be in a predetermined position relative to the spindle before the clutch can be engaged. This requires the operator to place the key into the cylinder lock key-hole, then manipulate the handle till he feels out by trial and error the proper position in which the key may be turned to engage the clutch to interlock the shank and the spindle. It is an object of this invention to overcome this difficulty by producing a clutch having a yieldable member which serves as a locator and will normally maintain the handle in some such desired predetermined position as horizontal, where a lever handle is used, which permits the cylinder lock to be actuated to interengage the clutch parts to lock the spindle and shank together. If the shank and the spindle are not properly aligned the handle shank need merely be rotated about the spindle whereupon the yieldable connection snaps into properly aligned position relative to the rest of the clutch which permits the cylinder lock to be turned to interlock the clutch parts and thus interlock the spindle and shank. The snapping of the yieldable portion of the clutch into engagement with the other member of the clutch notifies the operator that the key may now be turned to interlock the shank and the spindle.

In the drawings:

Fig. 1 is a vertical section through the handle assembly and a portion of a latch showing the clutch yieldably engaged but not positively blocked so that the handle is freely rotatable about the spindle.

Fig. 2 is an exploded view showing the several parts of the handle in disassembled position.

Figs. 3 and 4 are sections along the lines 3—3 and 4—4, respectively of Fig. 1.

Fig. 5 is a section corresponding to Fig. 3 with the handle rotated 90°.

Fig. 6 is a section corresponding to Fig. 4 with the cylinder lock rotated 90°.

Figure 7:
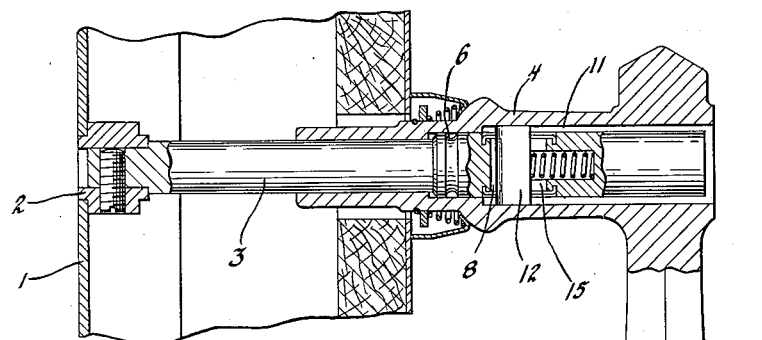

Fig. 7 is a horizontal longitudinal section through the handle assembly along the line 7—7 of Fig. 1.

Figure 8:
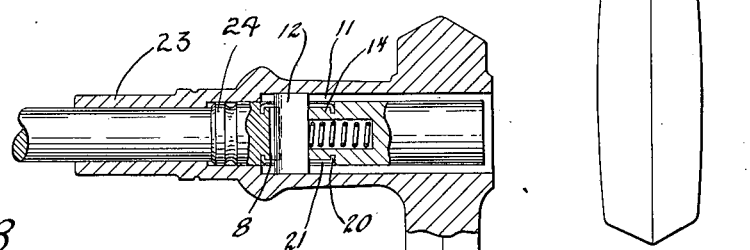

Fig. 8 is a view similar to Fig. 7 showing the clutch positively engaged so that the shank and spindle are interlocked.

Figure 9:
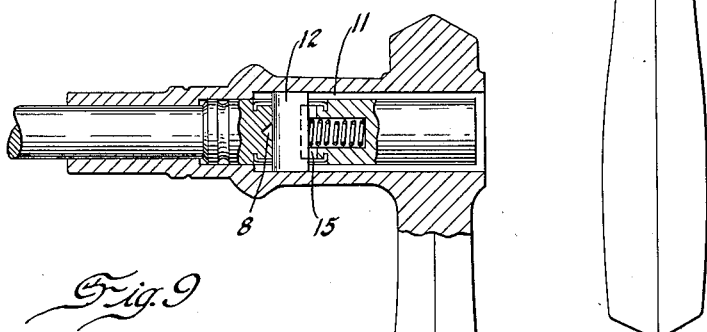

Fig. 9 is a view similar to Fig. 1 with the clutch disengaged and the handle rotated 90°.

Referring more particularly to the drawings there is shown generally at 1 a conventional latch having a rollback 2. The latch may be any conventional type having a bolt, spring projected or otherwise. The rollback 2 which retracts the bolt has secured therein the spindle 3 which has rotatably mounted thereon the shank 4 provided with any suitable type of handle, such as the lever handle 5. The outer end of the spindle 3 is provided with an annular groove 6 for the pin 7 which passes through the shank 4 to key the shank 4 upon the spindle 3 thus permitting relative rotation between the shank and spindle but locking the same against relative longitudinal movement. The end of the spindle 3 is also provided with the V-groove 8 which extends diametrically across the longitudinal axis of the spindle.

The shank 4 is provided with a cylindrical opening 10 the wall of which has a pair of diametrically opposed grooves 11 which slidably receive, and serve as guideways for, the pawl 12. The cylindrical opening receives a conventional key operated tumbler type of cylinder lock 13, the inner end of which is provided with a block 14 having a groove 15 in its inner face. The cylinder lock 13 and block 14 are also provided with the longitudinal cylindrical opening 16 which receives and serves as a seat for the coil spring 17. The coil spring 17 at all times presses against and maintains the pawl 12 under a spring load. The inner end of the spindle 3 is provided with an annular groove 18 and the inner end of the cylinder 13 is provided with a similar annular groove 19 which receive the flanged ends 20 of the clip retainers 21 on opposite sides of the pawl 12. The retainers 21 have a rotatable engagement with the spindle 3 in the groove 18 when the shank 4 is rotated about the spindle 3. The clip retainers 21 are backed up by the wall of the cylindrical opening 22 and thus held in interengaging relation with the cylinder 13 and spindle 3.

The operation of the device is as follows:

If it is desired to place the shank 4 in freely rotatable relation with the spindle 3 so that the turning of the handle 5 will be ineffective to turn the rollback 2 and retract the latch bolt, the key is inserted in the cylinder lock, retracting the lock tumblers in the usual way, permitting the cylinder 13 to be turned a predetermined distance regulated by the conventional cooperating stops on the cylinder lock and in the opening 16 of the shank 4 which places the groove 15 in the block 14 in alignment with the pawl 12, as shown in Figures 1, 3, 4, and 7. At this time the pawl 12, due to the tension of the spring 17, is held in the groove 8 in the inner end face of the spindle 3. Thus, since the coil spring 17 is sufficiently strong, the handle 5 is held in horizontal position because the spring 17 acts to prevent the pawl 12 from being cammed out of the groove 8 in the spindle 3. This yielding engagement of the pawl 12 in the groove 8 prevents the handle 5 from swinging back and forth about the spindle 3 in case the vehicle is in motion and retains the handle 5 in horizontal position aligned with the other handles on the vehicle body. If sufficient force is applied to the handle 5 the tension of the spring 15 is overcome, the pawl 12 is cammed out of groove 8 in the guideways 11 of the shank 4 by the cam faces 9 of the groove 8, thus permitting the shank 4 to rotate idly about the spindle 3 and effectively preventing rotation of the rollback 2 and retraction of the latch bolt. Continued rotation of the handle 5 will simply cause the pawl 12 to snap in and out of the groove 8.

If it is desired to interlock the shank 4 and the spindle 3, assuming that the pawl 12 is engaged with the groove 8, as shown in Figures 1 and 7, it is only necessary to insert the key in the cylinder lock and turn the same until the groove 15 is disaligned with the pawl 12, as shown in Figures 6 and 8. At this time the block 14 effectively blocks the outward movement of the pawl 12 in the guideways 11 and thus the pawl interlocks and effectively transmits the torque from the shank 4 to the spindle 3 to in turn actuate the rollback and retract the latch bolt.

Now, assuming that the pawl 12 is in the position shown in Figures 5 and 9, that is, out of alignment with the groove 15, but in alignment with the groove 8, in such case the handle is given a partial turn until the pawl 12 snaps into the groove 8. When the pawl 12 snaps into the groove 8 the operator will be apprised of this by feeling the bump or by a slight click. At this time the cylinder lock 13 can be rotated to disalign the groove 15 and the pawl 12, thus placing the block 14 in effective blocking relation with the pawl 12. Since the pawl 12 can not move outwardly in the guideways 11, the torque of the shank 4 will be transmitted through the pawl 12 to the spindle 3.

From the above description it is thus seen that the handle assembly above described is essentially characterized by a spindle and a handle shank freely rotatable one relatively about the other which may be interlocked by a clutch of the type having a yieldable clutch member which may be blocked from movement relative to the other clutch member when it is desired to interlock the handle shank and the spindle, and which may be permitted to yield relative to the other clutch member when it is desired to permit the handle shank to rotate freely relatively about the spindle whereby rotation of the handle shank is ineffective to retract the latch bolt.

In the various types of freely rotatable handles known to the applicant it has been found that when the clutch is disengaged a pipe can be placed over the end of the handle and if sufficient outward force is applied to the pipe as the handle and pipe are rotated that the shank will grip the spindle sufficiently to turn the rollback in spite of the disengaged clutch and retract the latch bolt. This serious defect has been prevalent in these types of freely rotatable handles because the bearing surface between the handle shank and the spindle has been too small. To remedy this defect the bearing surface of that portion 23 of the shank between the enlarged head 24 of the spindle and the rollback 2 has been increased to a considerable extent over that of the prior art. The handle shown is substantially full size and it has been found that if the shank portion 23 is extended about an inch along the spindle between the spindle head and the rollback that the spindle can not be rotated by applying a pipe to the handle as above specified. It is, of course, understood that the area of the bearing surface between the spindle and the shank, if the above mentioned defect is to be avoided, is necessarily dependent on the size of the handle shank and of the spindle and will vary accordingly.

I claim:

1. A handle assembly comprising in combination a spindle and a shank, the one being freely rotatable relative to the other, and a clutch between the shank and the spindle comprising a pair of interengageable members one of which is yieldably held in contact with the other clutch member, and means only for blocking the yieldable member of the clutch to hold the said members in positive interengagement whereby the shank and spindle are locked against relative rotative movement.

2. A handle assembly comprising in combination a spindle and a shank, the one being freely rotatable relative to the other, and a clutch between the shank and the spindle comprising a pair of interengageable members and resilient means for yieldably holding the members interengaged, and a key controlled blocking member arranged to be moved into the path of the yieldable member when already yieldably interengaged with the other member to positively hold the clutch members interengaged whereby the shank and spindle are locked against relative rotation.

3. A handle assembly comprising in combination a spindle and a shank one of which is freely rotatable about the other, and a clutch comprising a yieldable pawl carried by one of said members, and a seat for the pawl carried by the other of said members, said pawl being yieldably held in contact with the pawl seat, and means for blocking the said pawl when engaged with the said seat to hold the pawl and seat in positive interengagement whereby the torque of the shank is transmitted through the clutch to the spindle.

4. A handle assembly comprising in combination a spindle and a shank, one of which is freely rotatable about the other, one of said members having a yieldable pawl and guideways for the same and the other of said members having a recessed seat for the said pawl, the said pawl being yieldably held in contact with said seat, and means for blocking the said pawl against movement in the said guideways to hold the pawl in positive interengagement with said seat whereby the pawl is held in the said seat and the torque of the shank is transmitted to the spindle.

5. A handle assembly comprising in combination a spindle and a shank, one of which is rotatable about the other, and a clutch between the shank and the spindle comprising a pawl seat fixed to one of the said members and a yieldable pawl and longitudinal guideways for the same in the other of said members whereby when the shank is rotated relative to the spindle the pawl snaps in and out of the pawl seat travelling back and forth in the said guideways, and means for optionally blocking the yieldable pawl against longitudinal movement to interlock the shank and spindle whereby the torque from the one is transmitted to the other.

6. A handle assembly comprising in combination a spindle and a shank, one being rotatable relative to the other, a clutch between the shank and the spindle comprising fixed and yieldable members, one of which rotates with the shank and the other of which rotates with the spindle, the said members having a cam surface whereby relative rotation between the shank and spindle disengages the said clutch members, and means for positively blocking the yieldable member from disengagement with the fixed member.

7. A handle assembly comprising in combination a spindle and a shank, one of which is freely rotatable about the other, a clutch member having a cam groove, and a spring loaded member yieldable longitudinally of the said shank and spindle, the one clutch member being mounted on the spindle and rotatable therewith, the other being carried by the shank and rotatable therewith, a block having a groove into which the yieldable member may retreat when aligned with the said groove to permit relative rotation between the shank and the spindle, the said block being movable relative to the yieldable member to disalign the groove with the yieldable member to block the said yieldable member and thereby interlock the shank and spindle.

8. A handle assembly comprising in combination a spindle and a shank adapted for relative rotation one about the other, a clutch member having a cam groove fixed to the spindle, longitudinal guideways in the shank, a yieldable pawl slidably mounted in the shank and yieldably interengaging the cam groove in the spindle, a blocking member rotatably mounted in the shank having a groove whereby when the groove is aligned with the pawl the shank is freely rotatable about the spindle and when the groove is disaligned with the pawl the block positively holds the pawl against longitudinal movement in the guideways to transmit the torque of the handle to the spindle.

9. A handle assembly comprising in combination a spindle and a shank adapted for relative rotation one about the other, a clutch member fixed to the spindle having a cam groove, longitudinal guideways in the shank, a yieldable pawl slidably mounted in the shank and yieldably interengaging the cam groove in the spindle, a cylinder lock rotatably mounted in the handle shank and having a blocking member at its inner end, the blocking member having a groove whereby when the lock is rotated to align the groove with the pawl the shank is freely rotatable about the spindle and when the groove is disaligned with the pawl the block positively holds the pawl against longitudinal movement in the guideways to transmit the driving torque of the handle to the spindle.

STEPHEN DE ORLOW.